United States Patent
Weber et al.

(10) Patent No.: US 12,502,453 B2
(45) Date of Patent: Dec. 23, 2025

(54) PORTABLE PATHOGEN-DISINFECTING AIR FILTER

(71) Applicant: VITALITY SERVICES LLC, Washington, DC (US)

(72) Inventors: Juergen Weber, Deggendorf (DE); Erhard Hinz, Berlin (DE)

(73) Assignee: Vitality Services LLC, Washington, DC (US)

( * ) Notice: Subject to any disclaimer, the term of this patent is extended or adjusted under 35 U.S.C. 154(b) by 345 days.

(21) Appl. No.: 18/377,802

(22) Filed: Oct. 8, 2023

(65) Prior Publication Data

US 2024/0033392 A1 Feb. 1, 2024

Related U.S. Application Data

(63) Continuation-in-part of application No. PCT/US2022/020129, filed on Mar. 14, 2022.

(51) Int. Cl.

| | |
|---|---|
| *B01D 39/10* | (2006.01) |
| *A61L 9/16* | (2006.01) |
| *B01D 46/00* | (2022.01) |
| *B01D 46/42* | (2006.01) |
| *B01D 46/46* | (2006.01) |

(52) U.S. Cl.
CPC ............ *A61L 9/16* (2013.01); *B01D 46/0028* (2013.01); *B01D 46/4263* (2013.01); *B01D 46/46* (2013.01); *A61L 2209/111* (2013.01); *A61L 2209/14* (2013.01); *B01D 2279/65* (2013.01)

(58) Field of Classification Search
CPC .. A61L 9/16; A61L 2209/111; A61L 2209/14; A61L 2209/15; A61L 2209/16; B01D 46/0028; B01D 46/00; B01D 46/4263; B01D 46/46; B01D 2279/65; B01D 39/2068; B01D 39/2027; B01D 2239/065; B01D 2239/1208; F24F 8/10
USPC .......................... 96/223, 225; 55/482, 482.1
See application file for complete search history.

(56) References Cited

U.S. PATENT DOCUMENTS

| 5,224,973 | A | * | 7/1993 | Hoppenstedt | ........... F01N 3/032 |
| | | | | | 219/535 |
| 5,240,478 | A | * | 8/1993 | Messina | ................. B01D 46/88 |
| | | | | | 55/471 |
| 5,288,298 | A | * | 2/1994 | Aston | ................ B01D 46/0038 |
| | | | | | 96/135 |
| 2005/0252177 | A1 | | 11/2005 | Ishikawa | |
| 2006/0199061 | A1 | | 9/2006 | Fiebig | |
| 2006/0292425 | A1 | | 12/2006 | Suh | |
| 2007/0137480 | A1 | | 6/2007 | Bergeron | |

(Continued)

*Primary Examiner* — Frank M Lawrence, Jr.
(74) *Attorney, Agent, or Firm* — Boris Leschinsky

(57) ABSTRACT

The high-temperature pathogen-disinfecting air filter includes a first layer of heated open-cell foam contained in a housing with an air pump configured to direct airflow across thereof. The first layer of the open-cell foam may be made of a metal alloy and includes a first electrically-resistive elongated body folded in a serpentine pattern. The pattern may define a sheet-like construction of the first layer making it convenient to incorporate into the air filter housing. The controller is provided to apply electrical energy to heat up the foam to a predetermined temperature, thereby providing heat to disinfect the airflow passing across the first layer. Additional foam layers and heat-resistant filters may also be provided.

14 Claims, 18 Drawing Sheets

(56) References Cited

U.S. PATENT DOCUMENTS

| | | |
|---|---|---|
| 2009/0010801 A1 | 1/2009 | Murphy |
| 2013/0272935 A1* | 10/2013 | Hauville ............ B01D 39/2017 |
| | | 423/210 |
| 2022/0184544 A1* | 6/2022 | Hourani ............. B01D 46/0002 |

* cited by examiner

PORTABLE PATHOGEN-DISINFECTING AIR FILTER

CROSS-REFERENCE DATA

This application is a continuation-in part of the co-pending International Patent Application No. PCT/US22/20129 filed 14 Mar. 2022 with the same title, which in turn claims a priority date benefit of a co-pending German Patent Application Number 10021001828.1 filed 9 Apr. 2021 by the same inventor, which is incorporated herein in its entirety by reference.

BACKGROUND

Without limiting the scope of the invention, its background is described in connection with air purifiers and air filters. More particularly, the invention describes a portable air filter combining a conventional heat-resistant filtering stage with one or more novel high-heat stages of air purification treatment designed to induce high momentary heat to the passing stream of ambient air, thereby destroying any pathogens suspended therein.

The term "pathogen" refers hereto to describe a variety of biological hazardous elements that pose a threat for a person upon inhalation thereof. Non-limiting examples of pathogens include viruses, bacteria, spores, and other microorganisms as well as a variety of organic pollutant particles that may be suspended in the air in a form of an aerosol.

An aerosol in broad terms is a heterogeneous mixture of small solid or liquid particles suspended in a gas, such as ambient air. The suspended particles may be present in the aerosol in various sizes. The size of the particle defines (among other factors) how long it is suspended in the air. Larger particles tend to drop down faster than smaller particles, which may persist in the air for long periods of time. Many biohazardous particles and pathogens are known to be present in the air, ranging from benign (such as pollen causing an allergic reaction) to dangerous, such as tuberculosis or flu pathogens in some cases.

The importance of breathing pathogen-free air became heightened in the past two years as part of the Covid-19 pandemic. An aerosol pathway of Covid-19 transmission is well established and is believed to be the main pathway for the virus to propagate itself. The size of liquid droplets exhaled by a person which may contain SARS-CoV-2 virus causing Covid-19 disease may have a broad range, extending from tiny droplets of several microns in diameter to larger droplets that fall out quickly after being exhaled by a person. It is these smallest particles that may be as little as just a few nanometers in size, which may present the greatest danger of transmission as they tend to float in the air for the longest time.

Commonly known face masks are not capable of providing complete protection against these smallest droplets suspended in the air. Cloth and paper masks are not capable of filtering these particles out, while more durable N95 masks are cumbersome to wear, require a very tight fit, and make it difficult to speak or even breathe for some people.

Conventional filter devices for filtering air and removing pathogens are known and are used in many ways. However, the prior art solutions are not suitable for such small, only micrometer ($\mu m$) particles like the SARS-CoV-2 virus.

Common High Efficiency Particulate Air (HEPA) filters are based on passing air through small and large pore diameters within the selected filter material. If the pore diameter is too large, the viruses pass the filter without any effort and are completely undamaged. However, if the pore diameter is reduced to catch the virus, the larger particles would clog the filter quickly. This necessitates HEPA filters to be changed frequently making them not attractive as a durable solution for treating ambient air. If the filter is not replaced frequently, the energy requirement for the ventilation fans increases rapidly, which in many cases can cause a motor failure or another overload failure caused by the increased airflow resistance.

Air disinfection using UV light has also been tried but did not gain broad acceptance. Effective air disinfection requires a high dose of UV to be delivered to the passing airflow. Conventional UV lights require a long exposure time to be effective against SARS-CoV-2 virus, thereby making these devices not practical for everyday use. In addition, UV bulbs generate ozone, which many people find undesirable.

A further known class of air purification systems are known as electrostatic precipitators which feature positively and negatively charged plates in the air duct. With increasing air contamination, the pathogen cleaning performance of these systems decreases linearly. Their efficiency is usually well below HEPA filters. Above all, these filter-less systems cannot efficiently remove particles below 0.3 $\mu m$ (micrometers) from the air—and therefore cannot be deemed as effective for protection against the SARS-CoV-19 virus with a size of only 0.1 $\mu m$.

Finally, air ionizers also do not have a physical filter. As so-called negative ion generators, they emit a negative ion charge that is supposed to attach to the particles in the air. Dust, pollen, or mold spores are supposed to absorb this electrical charge and then, due to their negative charge, adhere to surfaces. These systems have a limitation in that the particles do not distinguish what they attach to. In carpets, these particles are whirled up again by steps taken by people or animals and made to be airborne again.

The need exists therefore for a practical air filter capable of disinfecting the ambient air from suspended particles and pathogens that operates better and more reliably than the filters of the prior art.

SUMMARY

Accordingly, it is an object of the present invention to overcome these and other drawbacks of the prior art by providing a novel air filter capable of effective disinfection of SARS-CoV-19 and other viruses and pathogens from the ambient air.

It is another object of the present invention to provide a novel air filter that is portable and can be conveniently used to disinfect ambient air in a normal size room.

It is a further object of the present invention to provide the air filter capable of effective air disinfection without excessive warming up of the air passing therethrough.

It is a further object of the present invention to provide a novel air filter capable of using a reasonably small amount of energy and not requiring frequent replacement of its operating parts.

It is yet a further object of the present invention to provide a novel air filter that is acceptably small in size, such that it can be placed in a room without being an eyesore.

The pathogen-disinfecting air filter of the invention includes at least a first layer of heated open-cell foam contained in a housing with an air pump configured to direct airflow across thereof. The first layer of the foam may be made of a metal including a metal alloy. The foam layer may include a first electrically-resistive elongated body made from a metal open-cell foam and extending from a first end to a second end thereof in a serpentine-folded pattern. The pattern may define a sheet-like construction of the first layer making it convenient to incorporate into the air filter housing. The first end of the elongated body is equipped with a first electrode, and the second end is equipped with a second electrode. The controller is provided to apply electrical energy at the first end and the second end of the elongated body. Electrical resistance causes the elongated body to heat up to a predetermined first temperature, thereby providing heat to the airflow passing across the first layer. Airborne pathogens are disinfected by heat while passing across and being redirected multiple times along their convoluted pathway through the open-cell foam of the first layer.

The air filter may further include a second layer of the open-cell foam of similar construction and the third layer of a HEPA filter sandwiched in-between the first and the second open-cell foam layers.

The elongated body of each open-cell foam layer is enclosed within a pair of insulating covers made from a thermo-insulating and non-electrically conductive material such as a hard polymer. The purpose of containing the foam layer between these two covers on both sides is to prevent any electrical contact therewith as well as insulate it from touching other components of the air filter to avoid unintended heat transmission therefrom.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF PREFERRED EMBODIMENTS OF THE INVENTION

Figure 1:
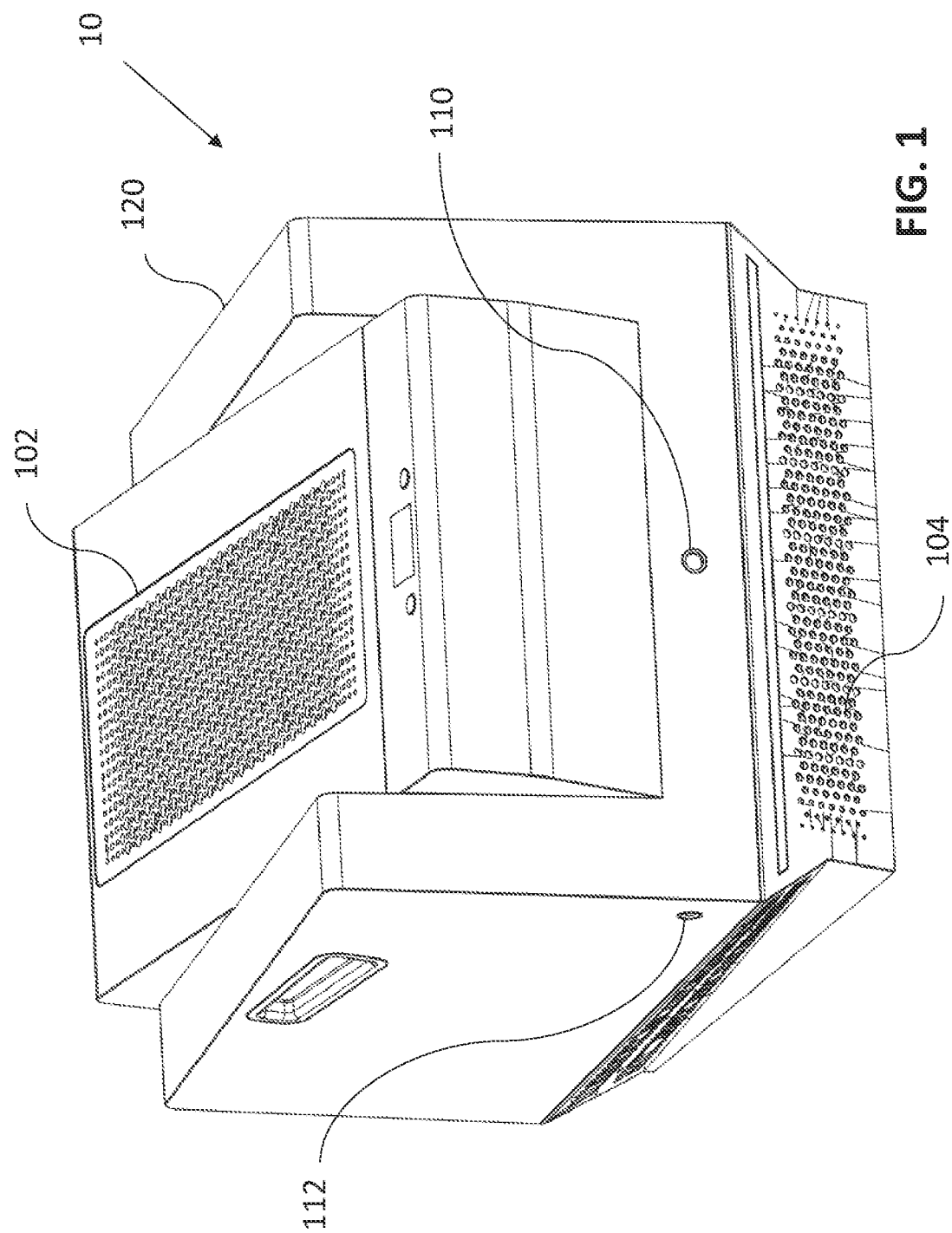
FIG. 1 is a perspective first view of the air filter of the present invention.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 2:
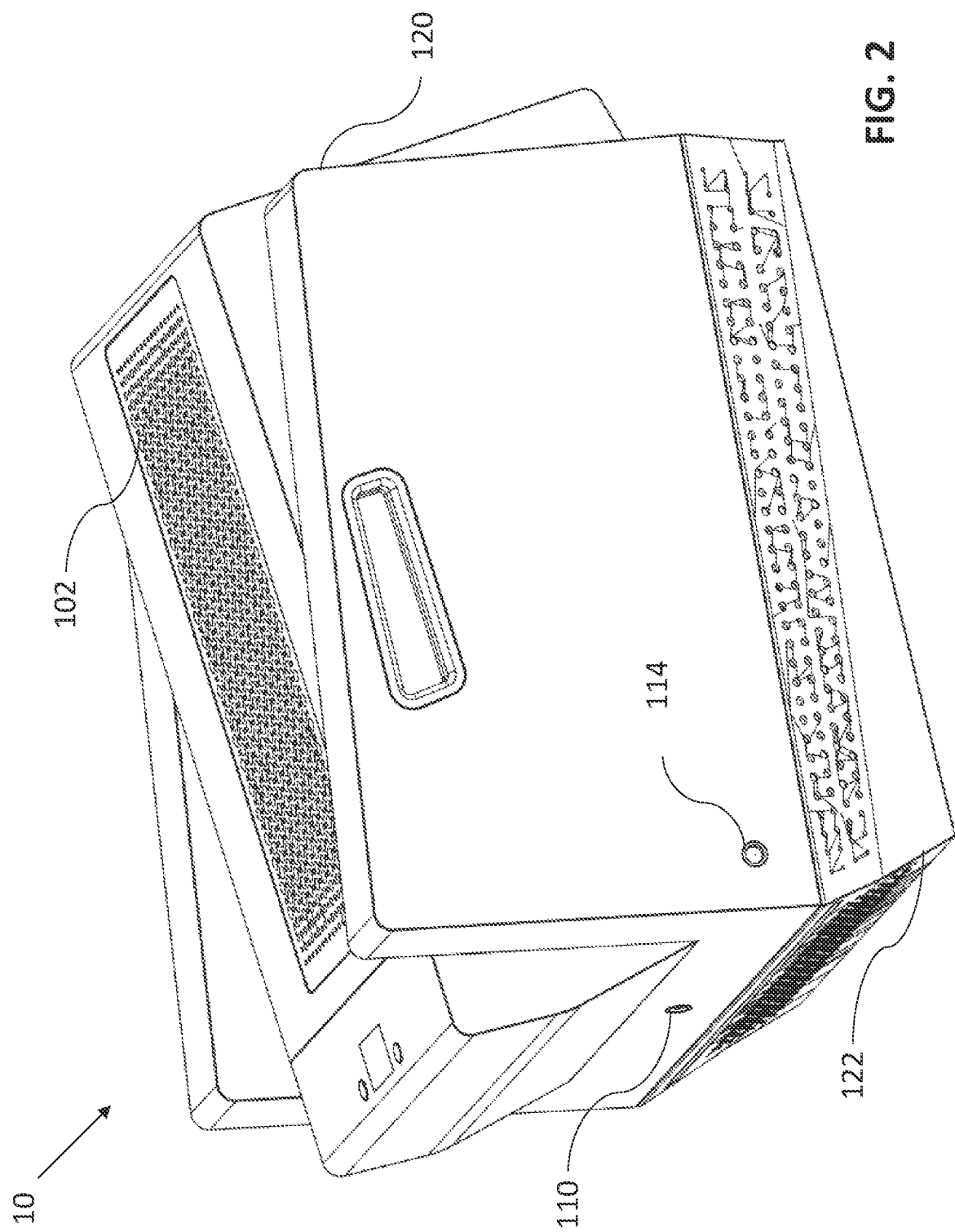
FIG. 2 is a perspective second view of the same.
Figure 3:
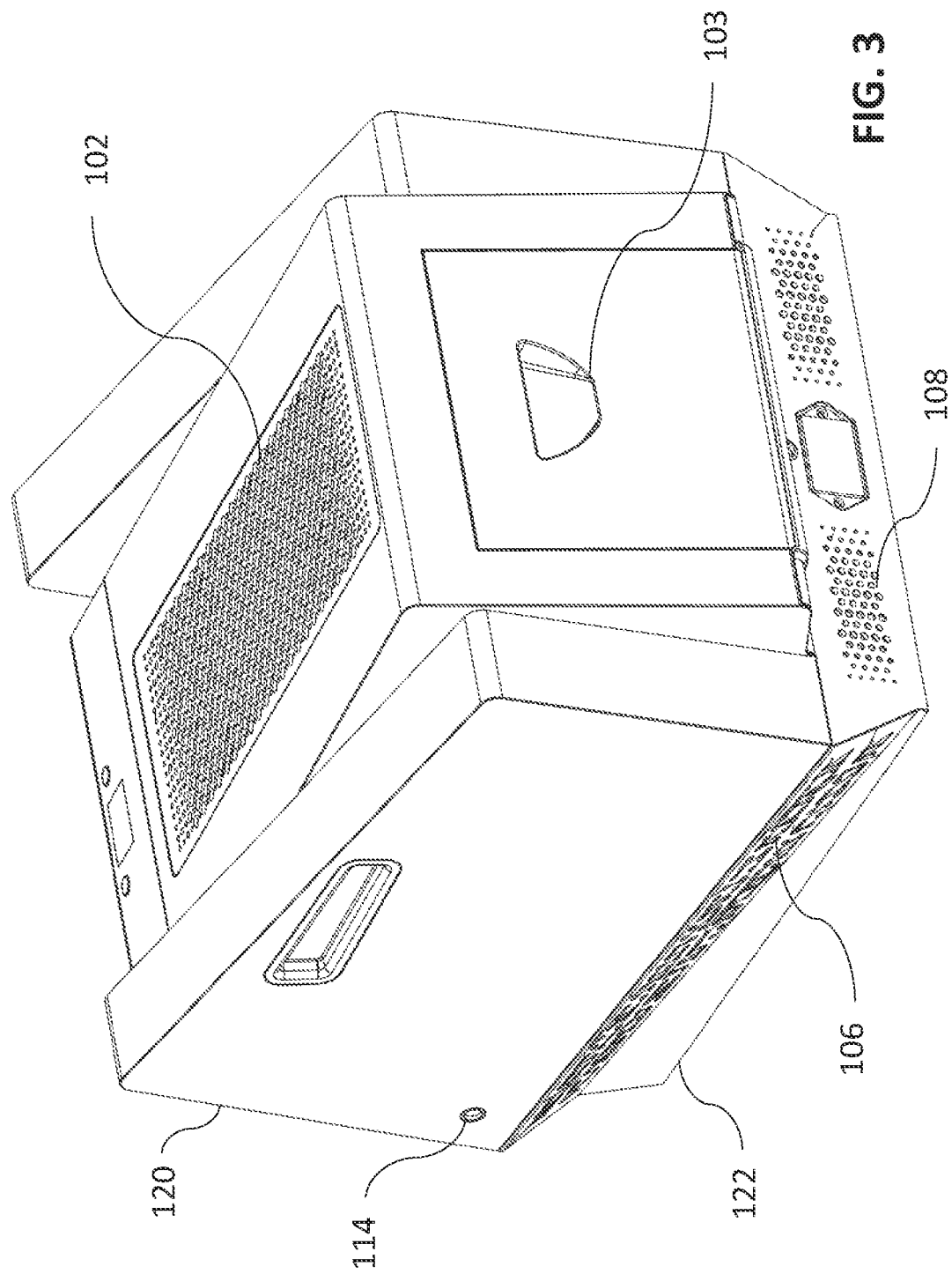
FIG. 3 is a perspective third view of the same.

FIGS. 1-3 show the air filter 10 of the present invention. The housing of the air filter may be made to include a lower tray 122 and the upper cover 120, with all of the components of the air filter 10 located inside the housing. Air inlet may be arranged on the lower tray via a plurality of inlet opening grates 104, 106, and 108 on some or all sides of the lower tray 122. The size and number of the inlet openings in each grate may be selected to minimize airflow resistance while at the same time minimizing the chance of large debris being sucked inside the main components of the filter as discussed in greater detail below. The inlet opening grates are functioning as a prefilter 2 (see FIG. 4) to protect the inside components of filter 10 from damage or clogging from outside debris.

Air outlet 102 may be positioned on top of the air filter and configured to emit the stream of clean disinfected air upwards for distribution in the ambient environment.

The filter assembly of the device may be accessed and replaced via the back door 103 as described in greater detail below.

A plurality of proximity sensors 110, 112, and 114 may be positioned on one, two, three, or all four sides of the air filter 10. Each proximity sensor may be configured to detect the presence of a person nearby. Information from the proximity sensors may be fed to a central controller 5 (see FIG. 4) which can be configured to operate the air filter differently depending on whether one or more people are present nearby. Controller 5 may be also configured to provide several modes of operation of the air filter 10, such as for example maximum air disinfection mode, power-saving mode, etc, wherein automatic detection of people may be used as an input for selecting the filter operating mode.

Figure 4:
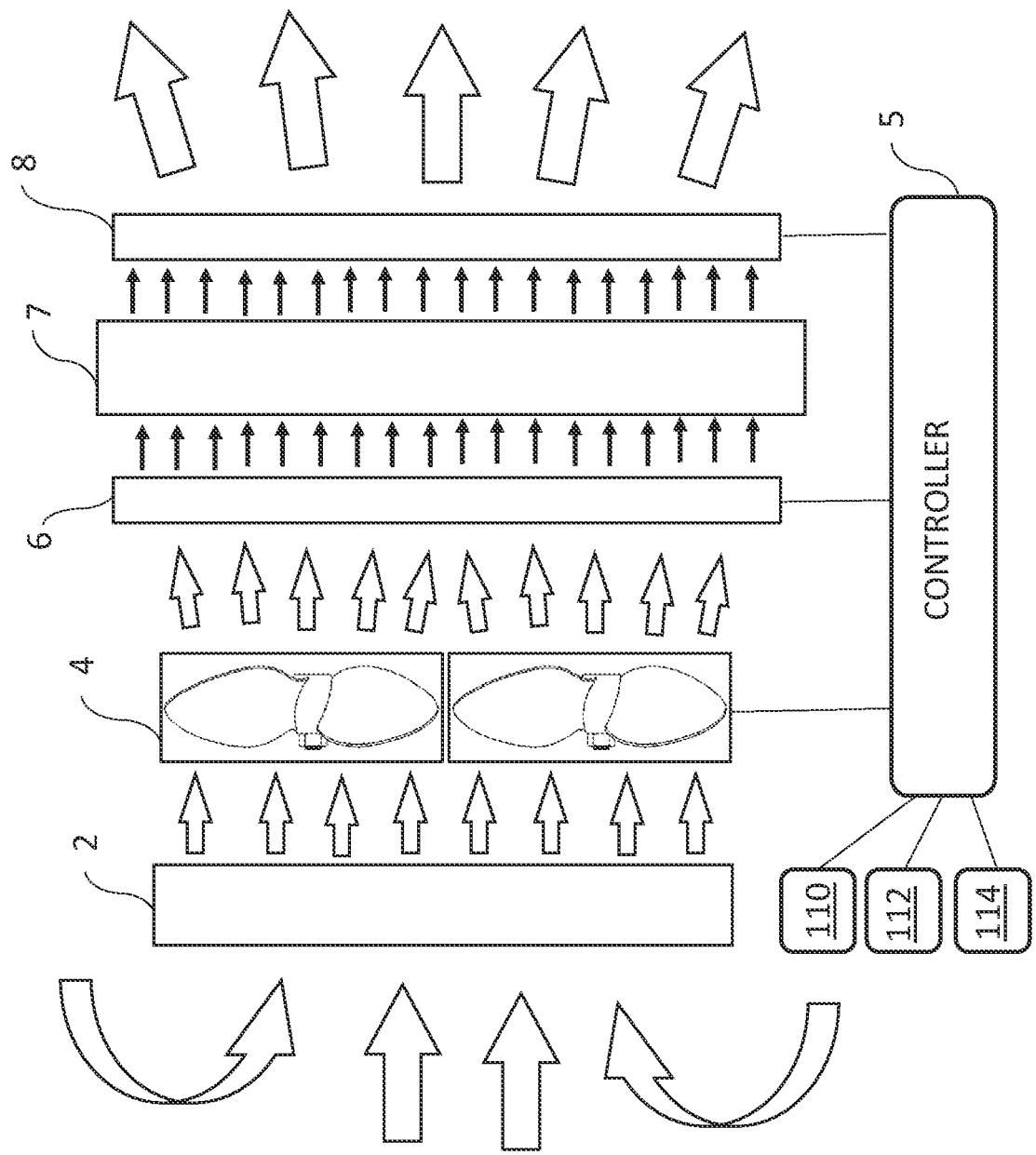
FIG. 4 is a block diagram of the main components of the air filter.

FIG. 4 shows a general diagram of the main components of the air filter 10. It includes a prefilter 2 aimed at preventing large debris from being drawn into the filter housing, followed by an air pump 4 configured to move air through the filter from its inlet at the bottom of the lower tray 122 through all the stages of filtration and air purification described below and towards the outlet 102 at the upper cover 120.

The air pump 4 may include one or more air pumps, such as two air pumps 40 and 42 shown in other figures. For applications requiring servicing a larger area, an array of air pumps may be used, including 3, 4, 5, 6, 7, 8, 9, 10, 12, 14, 16, 18, 20 or more air pumps as the invention is not limited in this regard. When more than one air pumps are used, they can be arranged to operate in parallel to increase the overall airflow. In the design described herein as an example, two air pumps of the same design are used. Each air pump is typically a centrifugal or rotary air pump having a plurality of blades on a rotor, which is turned by an electric motor. The motor of each air pump is connected to the controller, which may be configured to adjust the speed of the rotor and therefore the volume of the airflow through the filter 10 depending on the mode of operation as well as other parameters. In a typical operation of an air filter in an enclosed environment, the flow of air from the air filter may be selected to assure full recirculation of air in the environment conducted between 2 and 10 times per hour to keep the risk of contamination acceptably low.

In one example of a 30 $m^2$ room with a 3 m ceiling, a 5 times per hour air replacement requires a total capacity of the air filter of about 450 $m^3$ per hour. In this case, each of the two air pumps would operate to deliver half of that airflow, or about 225 $m^3$ per hour. Other applications, such as for example for an interior of a passenger car, would require a substantially lower airflow to be produced by the device. On the other side, integration of the device with existing HVAC systems would require an increased flow capacity for the filter—depending on the size of the dwelling serviced by the HVAC system, which may be a residential house with multiple rooms or an even bigger structure. The use of the present invention is advantageous over conventional HEPA filters when integrated with the HVAC system as the flow resistance of the present air filter is much lower than that of the HEPA filter with comparable disinfecting performance. In addition, airflow resistance of the air filter of the present invention does not increase over time as compared to a conventional HEPA filter which tends to suffer from clogging by the debris that gets trapped inside the filter.

Figure 5:
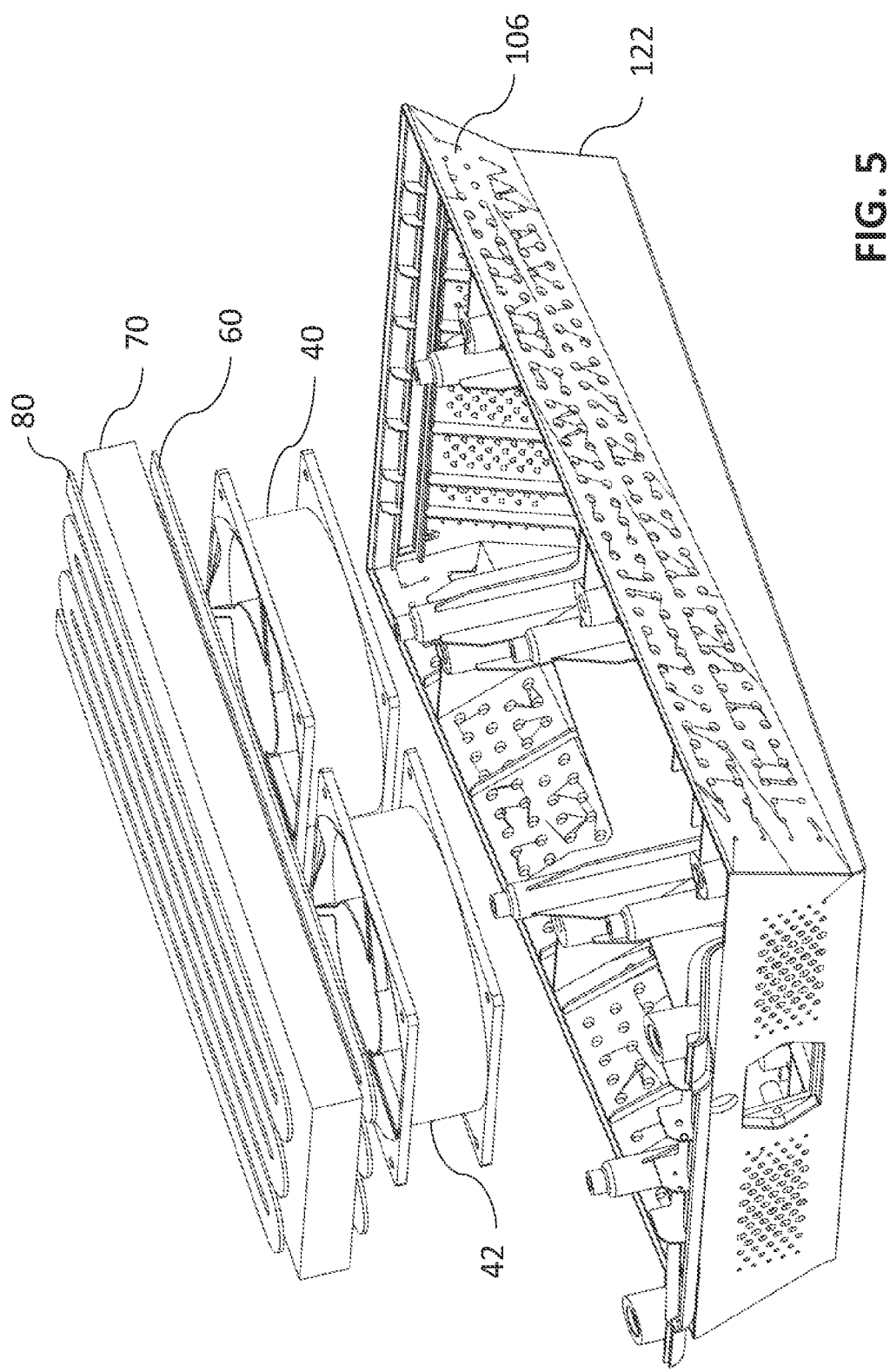
FIG. 5 is an exploded view of the main components of the same.
Figure 6:
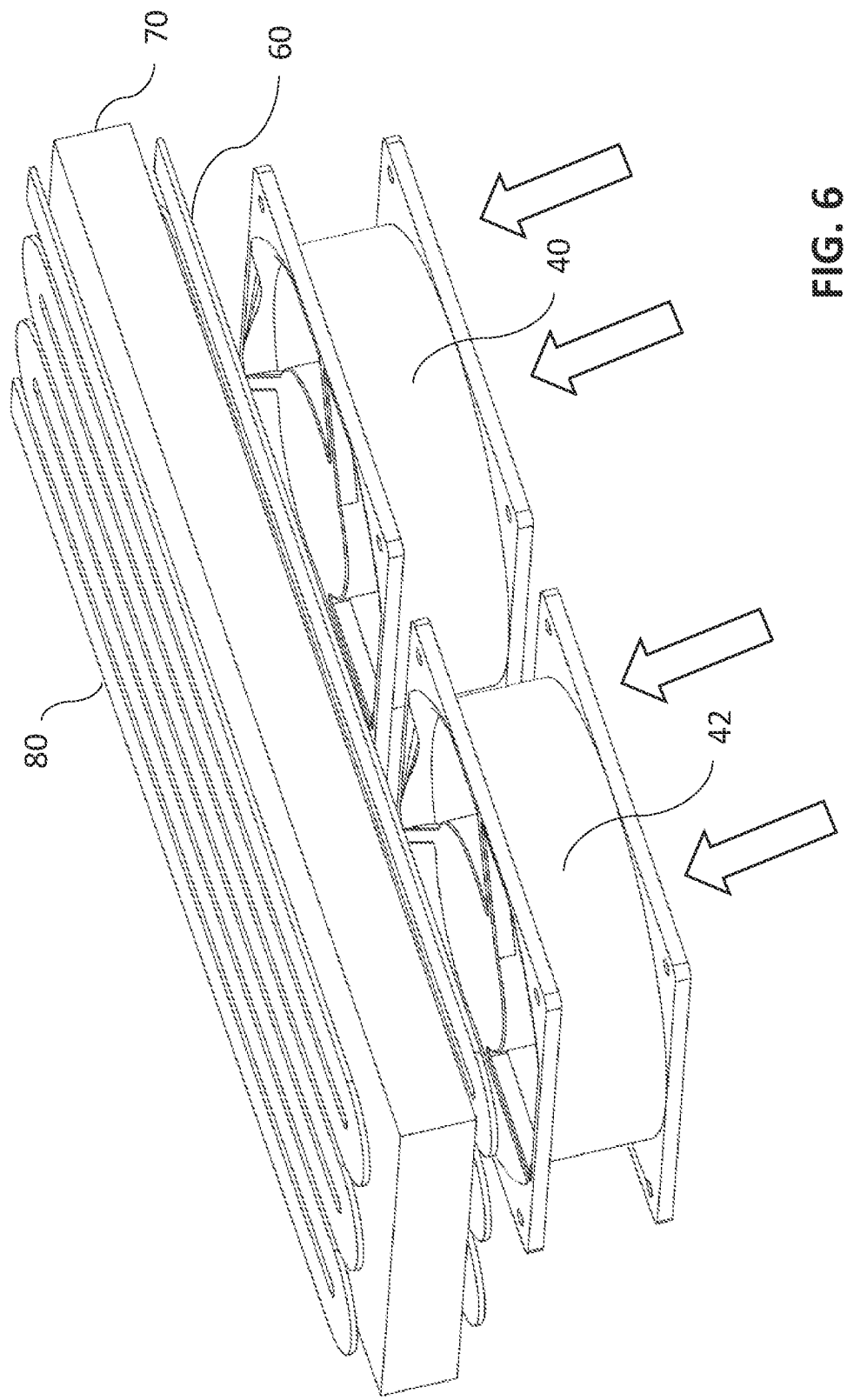
FIG. 6 is a close-up perspective view of the filter assembly with top and bottom covers removed.
Figure 7:
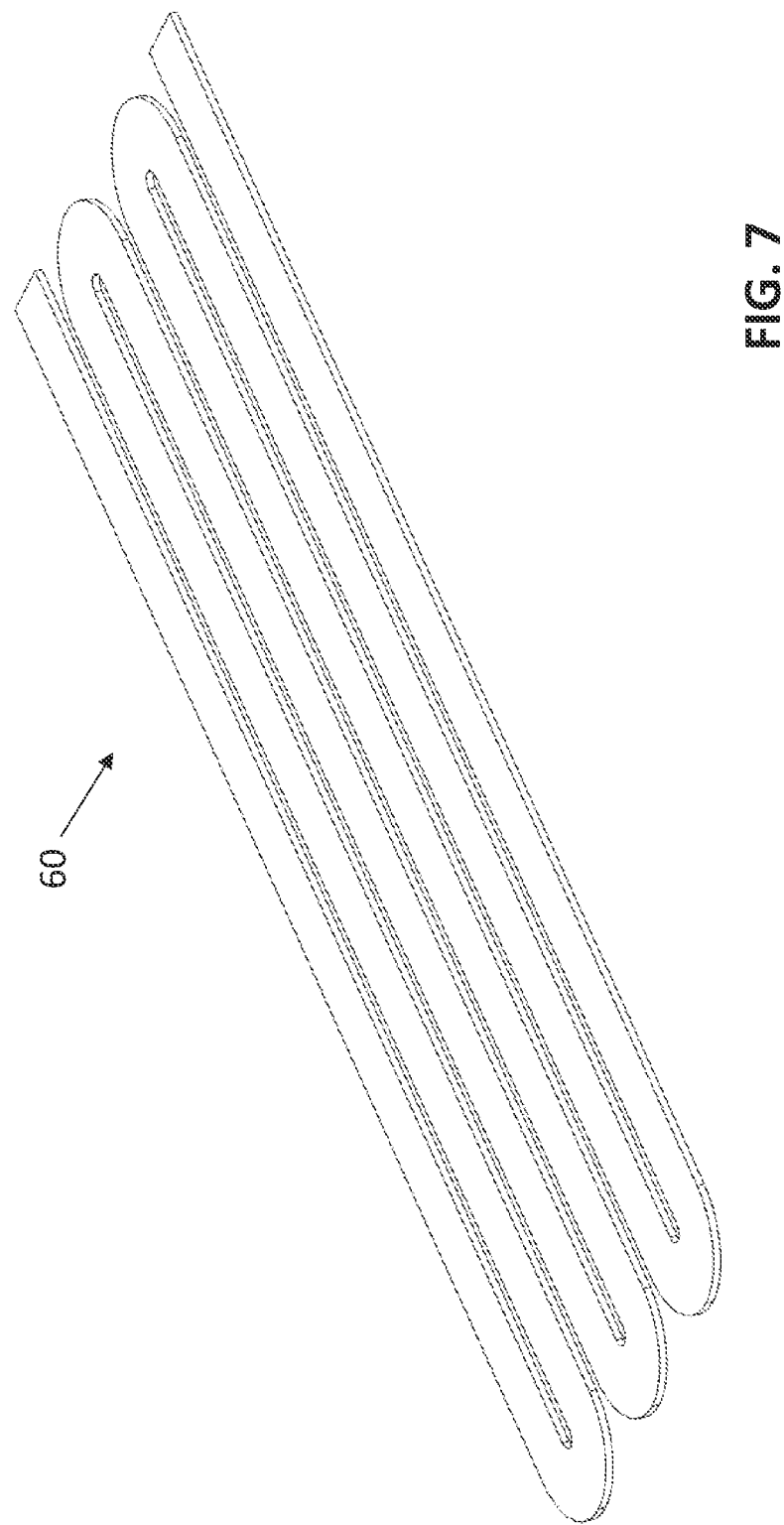
FIG. 7 is a perspective view of the first elongated body of the open-cell foam of the invention.

After drawing air through the prefilter 2, the air pump 4 may be configured to direct the flow of air towards the main stages of filtration and purification, which are now described in greater detail. The first stage 6 of air purification acts on the passing air by imparting momentary heat to disinfect the pathogens. The active element of the first stage 6 is the serpentine-shaped elongated body 60 made from an open-cell foam as shown among other filter components in FIGS. 5 and 6 and in greater detail in FIGS. 7 through 9.

The elongated body 60 is configured to provide a passage for the ambient air through an open-cell media heated to a predetermined temperature so as to impart a momentary heat to disinfect the passing air from any pathogens or volatile particles suspended therein. The air is passed after that through a heat-resistant HEPA filter 70 (such as made from fiberglass) and then through a second layer of the open cell heated metal foam.

As may be appreciated by those skilled in the art, this configuration is described as an example of one practical design of the air filter 10. Other configurations having a single metal foam layer or multiple metal foam layers are also considered by the present invention, possibly in combination with one or more HEPA or other filter stages.

Figure 9:
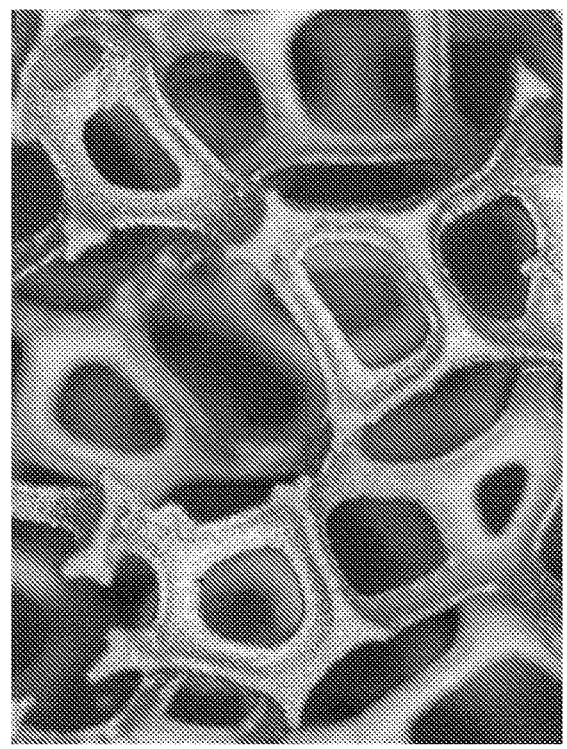
FIG. 9 is a close-up view of the open-cell foam structure.

The open-cell foam layer is now described in greater detail. The foam itself may be made from an electrically-resistive porous material such as a metal or a metal alloy designed to generate heat from passing electrical current. The details of the close-up view of the open-cell metal foam are seen in FIG. 9 and show the complex mesh of small metal struts with voids in-between allowing for air passage therethrough. Importantly, there is no direct path for the air across the foam. This forces various streams to turn and break apart as the air flows through the foam cells, thereby assuring a more even exposure of all parts of the airflow to the heat emanating from the metal struts of the metal foam of the invention.

Exemplary details of the methods used to produce these metal foams may be found in the article by Paresin A et. al entitled CVD Technique for Inco Nickel Foam Production, Advanced Engineering Materials, 2004, Vol. 6, No. 6, pp. 454-459, incorporated herein in its entirety by reference. A variety of suitable metals or metal alloys may be used. In some examples of the present invention, the metal foam of the filter may be made from a Nickel-Chromium or a Ni—Fe-AL alloy.

The present invention departs from conventional wisdom in the design of the open-cell foam layer. Conventional foam filters are made as solid sheets placed across the entirety of the airflow through the filter. This simple approach is not practical for the invention as there is no simple way to cause an evenly distributed heating of a foam sheet in this configuration. According to the invention, controlled and adjustable heating of the metal foam is provided by applying electrical current entering on one side of the foam component and leaving on the other side thereof. A conventional rectangular shape is not practical to achieve uniform heating of the foam. Instead, the present invention makes the open cell foam components as an elongated body having a uniform width and thickness throughout the entire length thereof, which is conducive to achieving uniform heating as a result of passing electrical current therethrough.

The elongated body 60 is made to have an overall length sufficient to permit desired air disinfection when passing across thereof. In embodiments, the total length of the elongated body may be from at least about 20 cm to about 400 cm or more depending on the application and capacity of the filter. In embodiments, the total length of the elongated body may be at least 20 cm, at least 30 cm, at least 40 cm, at least 50 cm, at least 60 cm, at least 70 cm, at least 80 cm, at least 90 cm, at least 100 cm, at least 120 cm, at least 140 cm, at least 160 cm, at least 180 cm, at least 200 cm, at least 220 cm, at least 250 cm, at least 300 cm, at least 350 cm, at least 400 cm, or even longer as the invention is not limited in this regard.

The thickness and porosity of the foam layer may be selected to assure adequate exposure to the heated metal struts and, at the same time, to not impart significant resistance to the airflow passing across the foam. In embodiments, the thickness of the foam may be from about at least 1 mm to about 50 mm, such as at least 1 mm, at least 1.5 mm, at least 2 mm, at least 2.5 mm, at least 3 mm, at least 4 mm, at least 5 mm, at least 6 mm, at least 7 mm, at least 8 mm, at least 9 mm, at least 10 mm, at least 12 mm, such as at least 14 mm, at least 16 mm, at least 18 mm, at least 20 mm, at least 25 mm, at least 30 mm, at least 35 mm, at least 40 mm, at least 45 mm, at least 50 mm or more depending on the application and foam porosity.

The porosity of the foam may be selected to be at least 1 pore per inch (ppi), at least 2 ppi, at least 3 ppi, at least 4 ppi, at least 5 ppi, at least 6 ppi, at least 7 ppi, at least 8 ppi, at least 9 ppi, at least 10 ppi, at least 12 ppi, at least 14 ppi, at least 16 ppi, at least 18 ppi, at least 20 ppi, at least 22 ppi, at least 24 ppi, at least 26 ppi, at least 28 ppi, at least 30 ppi, at least 35 ppi, at least 40 ppi, at least 45 ppi, or greater depending on the specifics of a particular application.

The electrical resistance of the foam may be selected to assure a desired range of heating when electrical current is passed therethrough. To be practical, a home-use filter may be designed for each metal foam component to consume as little electrical power as practical and yet provide sufficient disinfection efficacy for the ambient air. In embodiments, each elongated body 60 may be designed to consume less than 2,000 Watts of electricity during continuous operation. In other embodiments, each elongated body may be designed to consume less than 1,500 Watts, less than 1,000 Watts, less than 900 Watts, less than 800 Watts, less than 700 Watts, less than 600 Watts, less than 500 Watts, less than 400 Watts, less than 300 Watts, or less than 200 Watts of electrical power. At the same time, the temperature of the metal foam when heated may be at least 70° C., at least 80° C., at least ° C., at least 100° C., at least 110° C., at least 120° C., at least 130° C., at least 140° C., at least 150° C., at least 170° C., at least 190° C., at least 200° C., at least 220° C., at least 240° C., at least 260° C., at least 280° C., at least 300° C., at least 320° C., or higher as specified by a particular application.

In further embodiments, the air filter 10 may be designed to provide at least a 90% efficacy, at least a 95% efficacy, at least a 96% efficacy, at least a 97% efficacy, at least a 98% efficacy, at least a 99% efficacy, at least 99.5% efficacy, at least 99.9% efficacy, at least 99.98% efficacy, and at least 99.99% efficacy in disinfecting the ambient air on a single pass therethrough, while consuming less than or equal to 2,000 Watts of electrical power.

Figure 8:
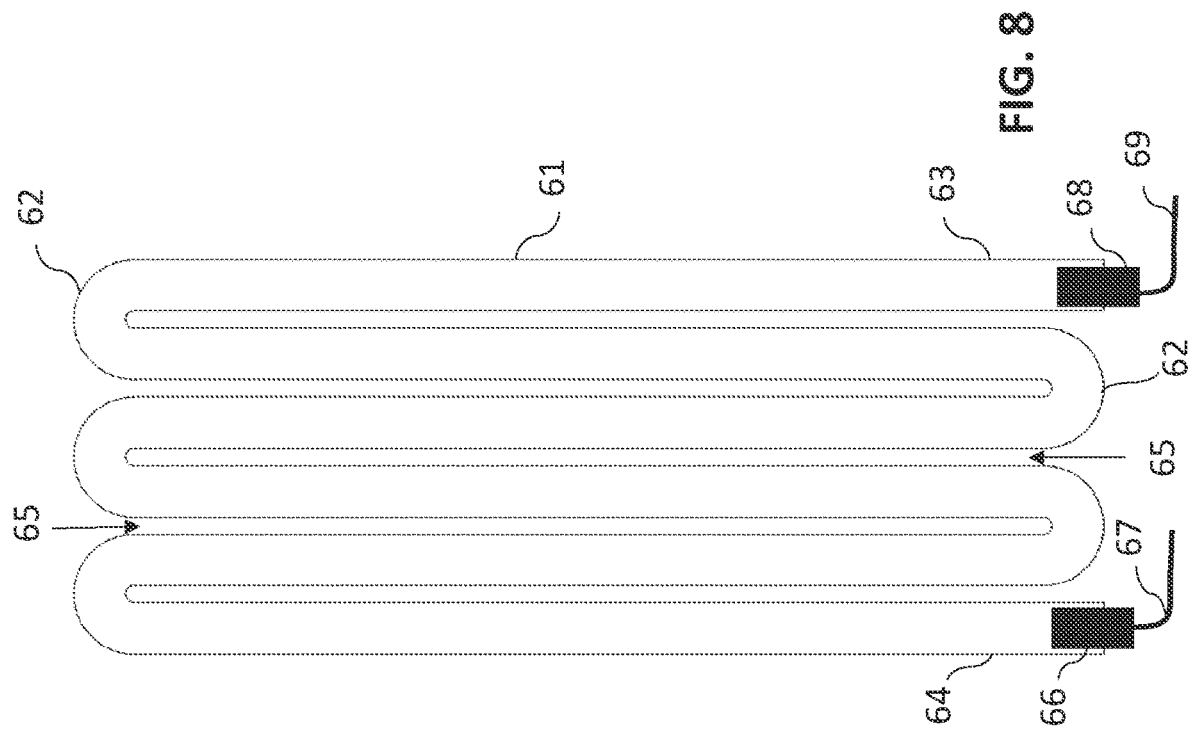
FIG. 8 is a top view of the same.

The elongated body 60 may be folded into a serpentine or another appropriate pattern to be practical for use in the air filter 10 and be more compatible with other filters such as a HEPA filter 7. FIG. 8 shows an example of such a folding pattern with straight sections 61 alternating with semicircular curved sections 62 leaving a small gap 65 between adjacent straight sections 61. Of note is that the entirety of the elongated body 60 has the same width and thickness, which is instrumental in providing an evenly distributed heat generation when electrical current passes therethrough.

Other geometrical variations of this folding pattern are also contemplated by the present invention, for example, a generally spiral arrangement where the center of the spiral constitutes a first end, and the outward end of the spiral is the second end of the elongated body. The spiral may be generally round or rectangular (with rounded corners) as required by the rest of the design of the air filter.

A first electrode 66 with the electrical cable 67 may be attached to a first 64 end of the elongated body 60, while the second electrode 68 with its cable 69 may be attached to the second end 63 of the elongated body 60. The cables 67 and 68 are then operably connected to the controller 5 configured to provide suitable electrical current through the metal foam of the elongated body 61.

Proper operation of the heated elongated body 60 requires careful electrical isolation of the metal foam to avoid unintended electrical leaks and side currents. In addition, thermal insulation is also required to assure safe usage of the heated foam layer and avoid unintended touching by other filter components or by a user. Finally, prevention of air from passing in-between the foam layers in the gaps 65 is required so as to assure that the entirety of the airflow passes through the foam and not around it. To accomplish all these objectives, enclosure 150 is provided as shown in FIGS. 10-16.

Each enclosure 150 consists of a lower cover 130 and the upper cover 140 having a mating design as seen in the drawings. Both the lower cover 130 and the upper cover 140 may be made from an electrically isolating and thermally insulating material, such as a heat-resistant polymer, capable of withstanding a temperature of at least 300 degrees C., at least 400 degrees C., at least 500 degrees C. or higher as required by a specific application of the filter. In embodiments, both covers may be made from Polyetherimide (PEI), Polyether ether ketone (PEEK), Polytetrafluoroethylene (PTFE), Polybenzimidazole (PBI), Polydicyclopentadiene (pDCPD), or another similar material.

Figure 10:
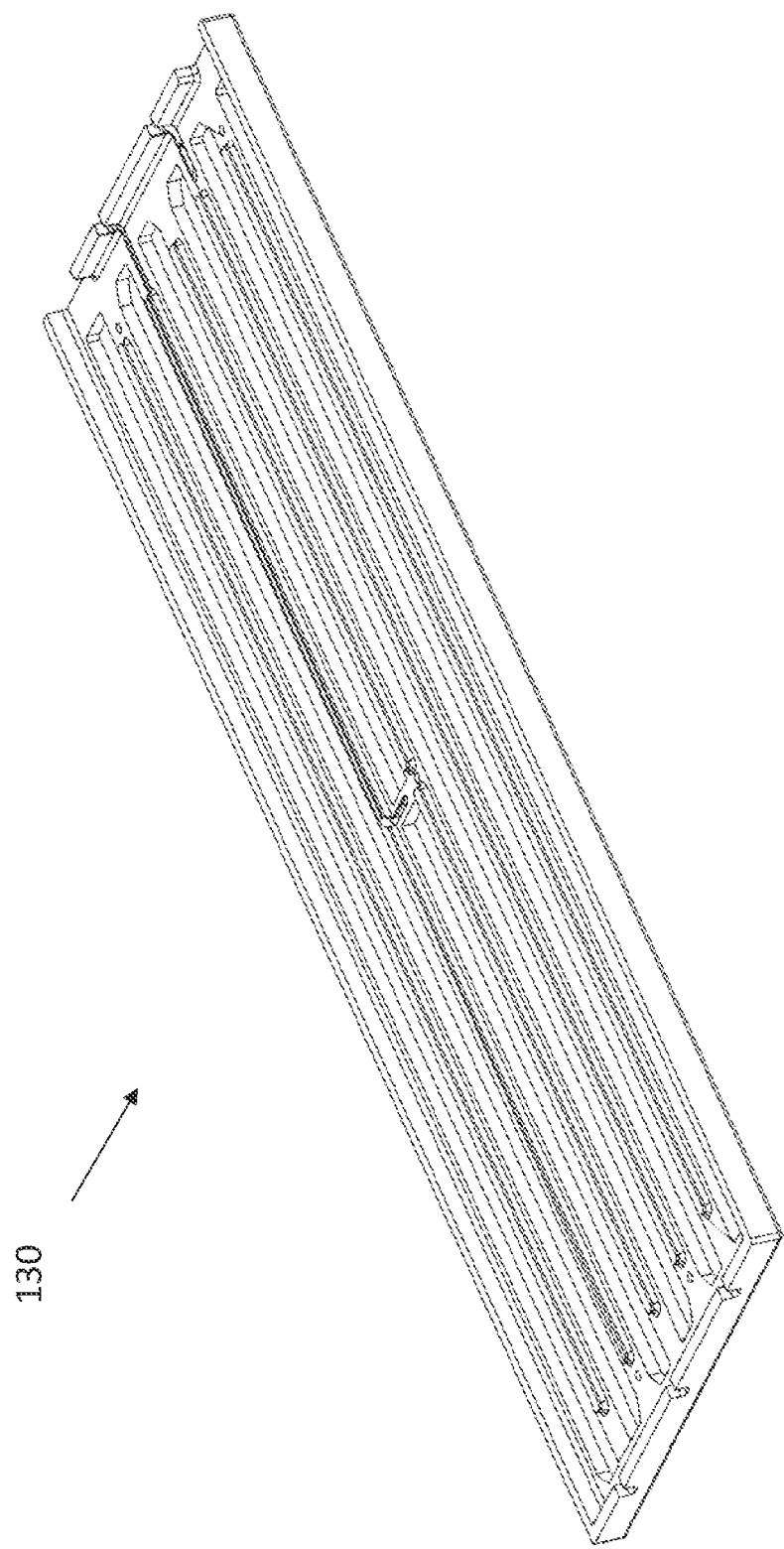
FIG. 10 is a perspective view of the bottom cover for the open-cell foam layer.
Figure 11:
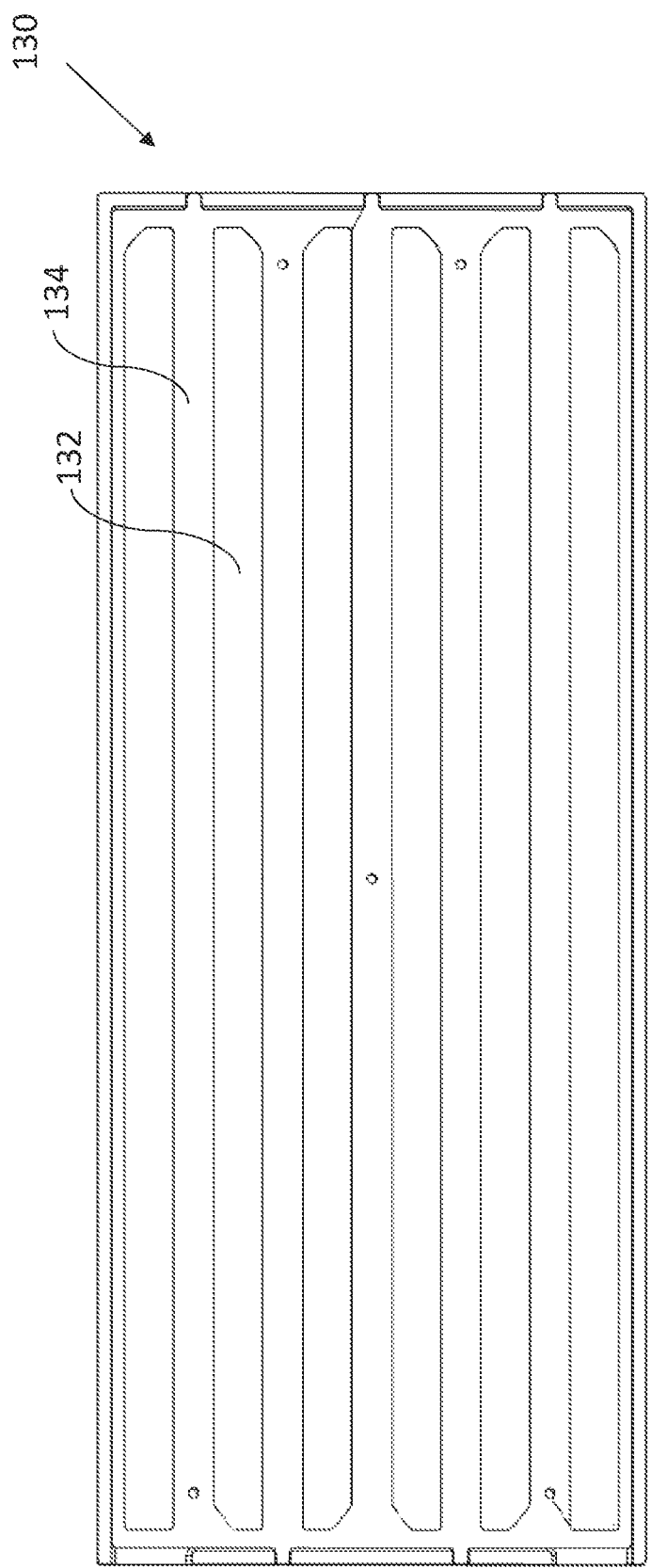
FIG. 11 is a top view of the same.

FIG. 10 and FIG. 11 show exemplary details of the lower cover 130 made with indentations sized to accept the serpentine-shaped elongated body 60. A number of elongated openings 132 between the parallel struts 134 are provided to expose the body of the foam when assembled. The length and width of each opening 132 may be made to be the same or slightly less than the length of each straight section 61 of the elongated body so that when assembled, the elongated body 60 may rest on top of the openings 132. The lower cover 130 may also have a number of features designed to accept and retain the elongated body 60 therein as well as accept the top cover 140 in a fixed orientation.

Figure 12:
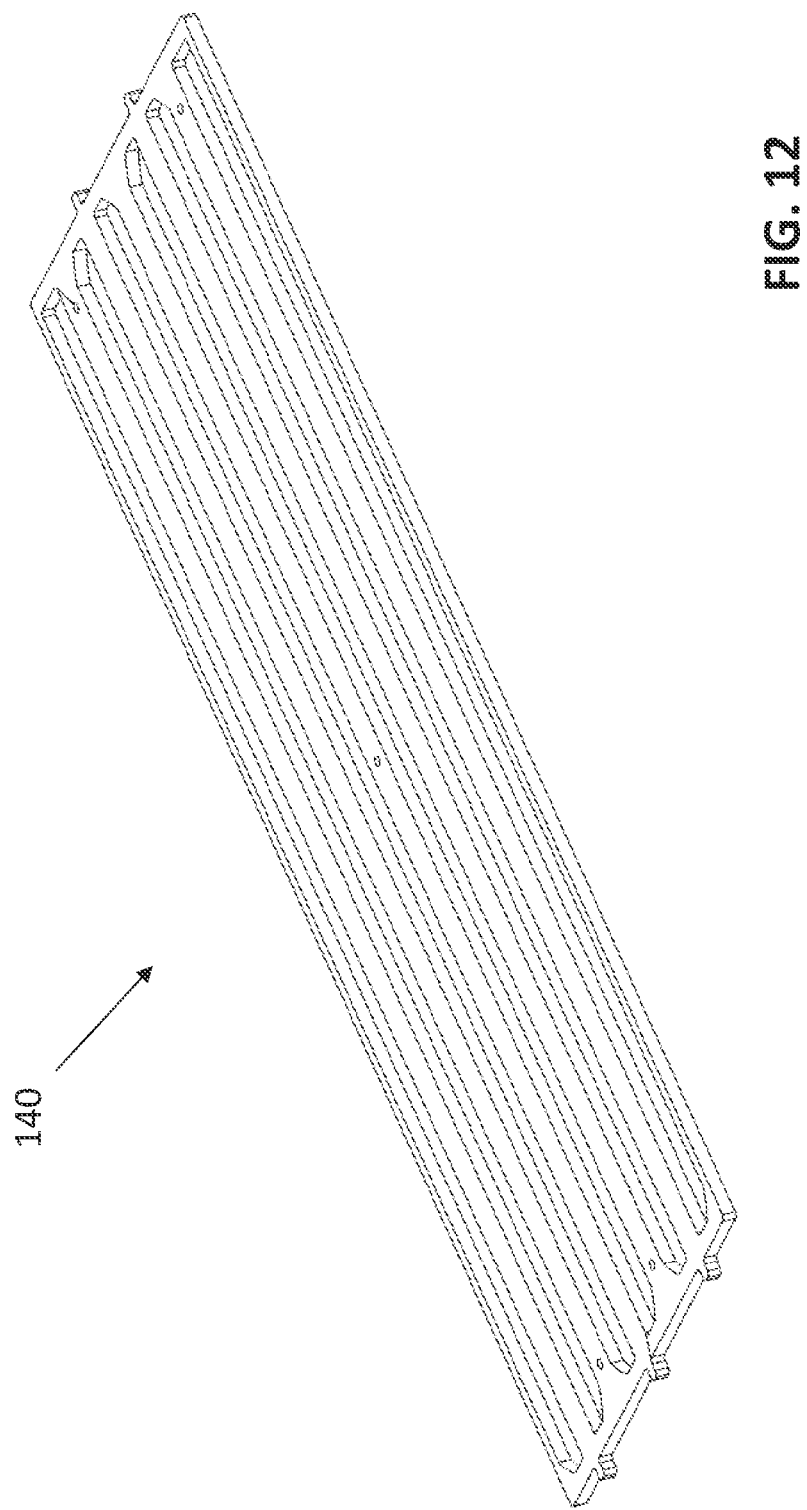
FIG. 12 is a perspective view of the top cover for the open-cell foam layer.
Figure 13:
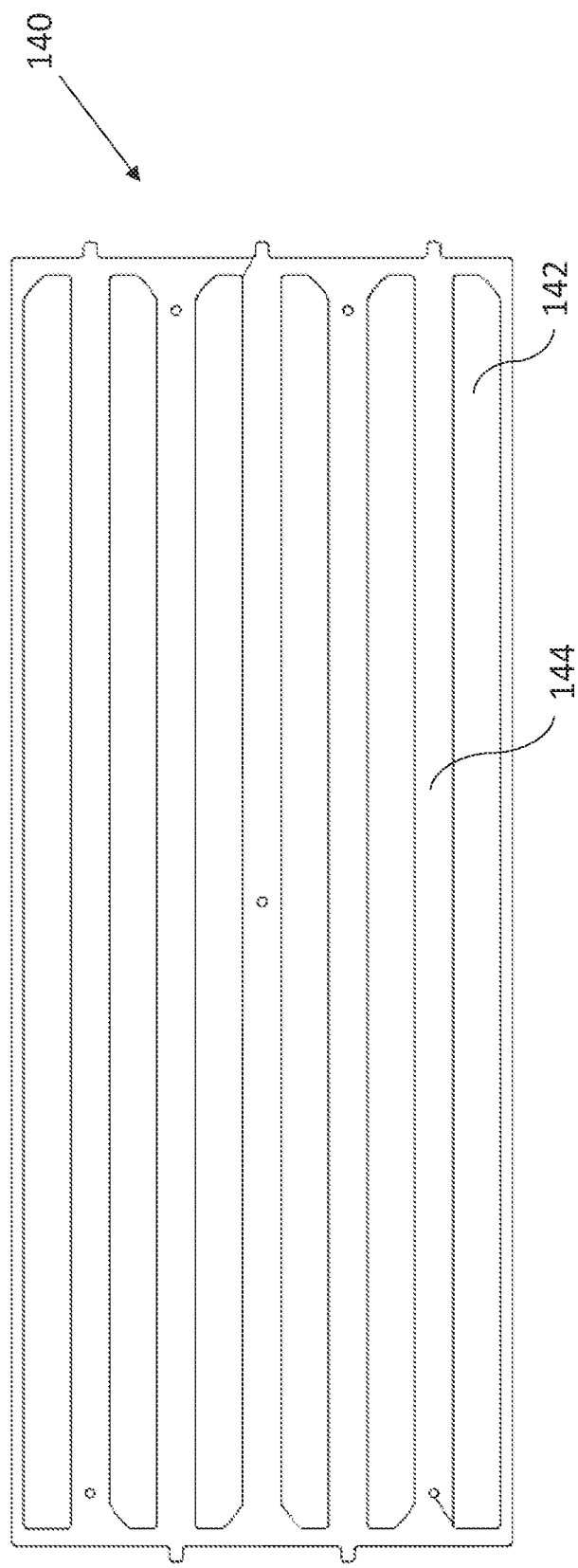
FIG. 13 is a top view of the same.

The top cover 140 is seen closely in FIGS. 12 and 13 and may include a number of elongated openings 142 between parallel struts 144 designed to allow access to the foam body 60 when placed on top thereof.

Figure 14:
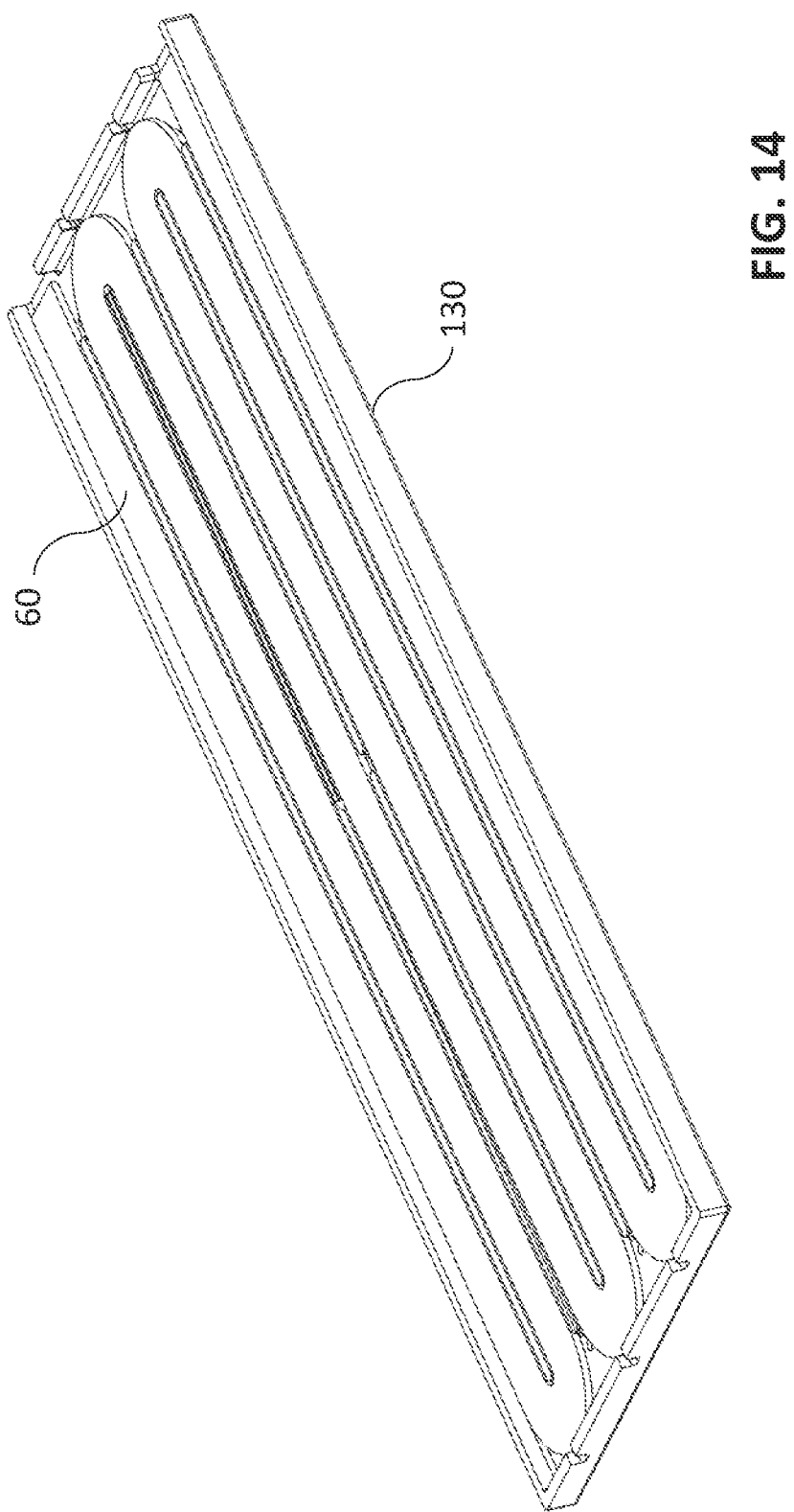
FIG. 14 is a perspective view of the foam elongated body placed into the bottom cover.
Figure 15:
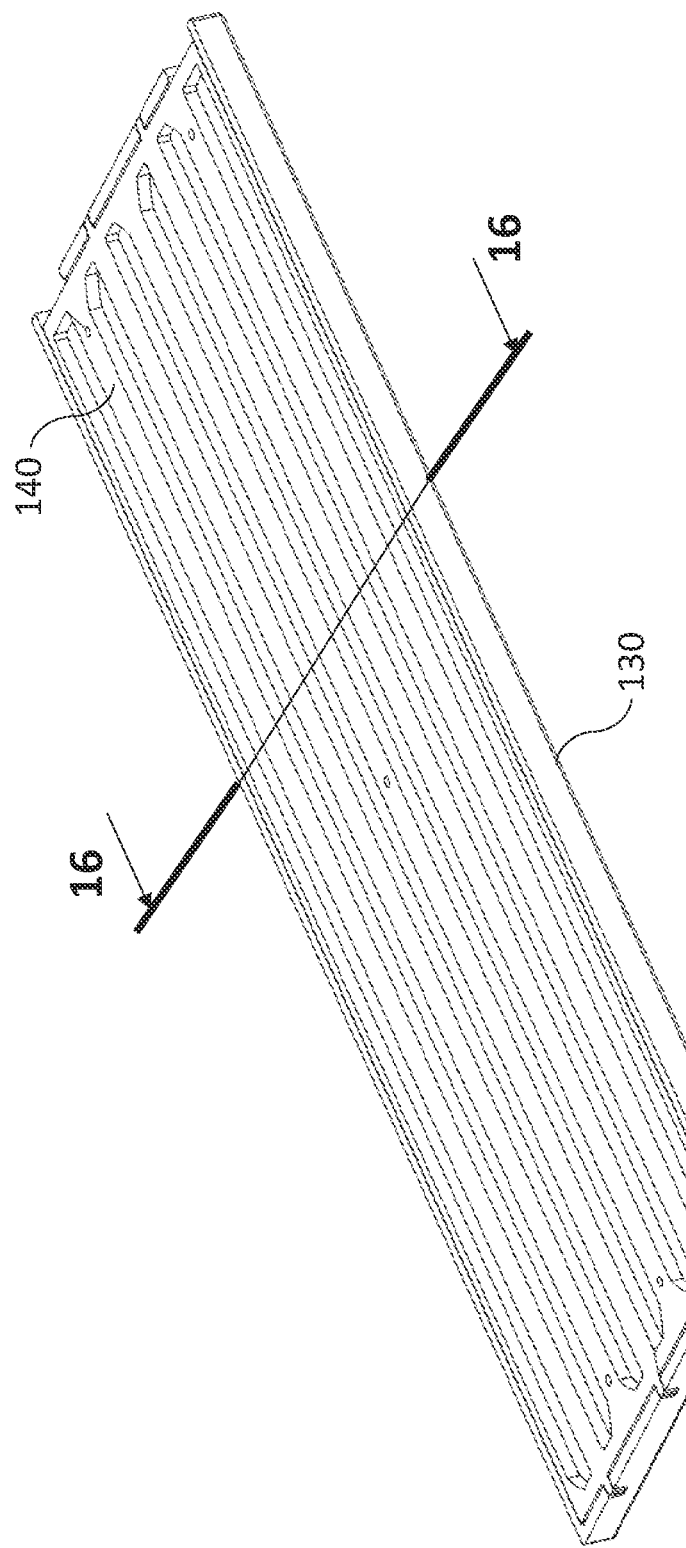
FIG. 15 is a perspective view of both the top cover and the bottom cover forming the enclosure for the elongated body of the open-cell foam in-between, FIG. 16 is a perspective cross-sectional view of the assembly of FIG. 15.
Figure 16:
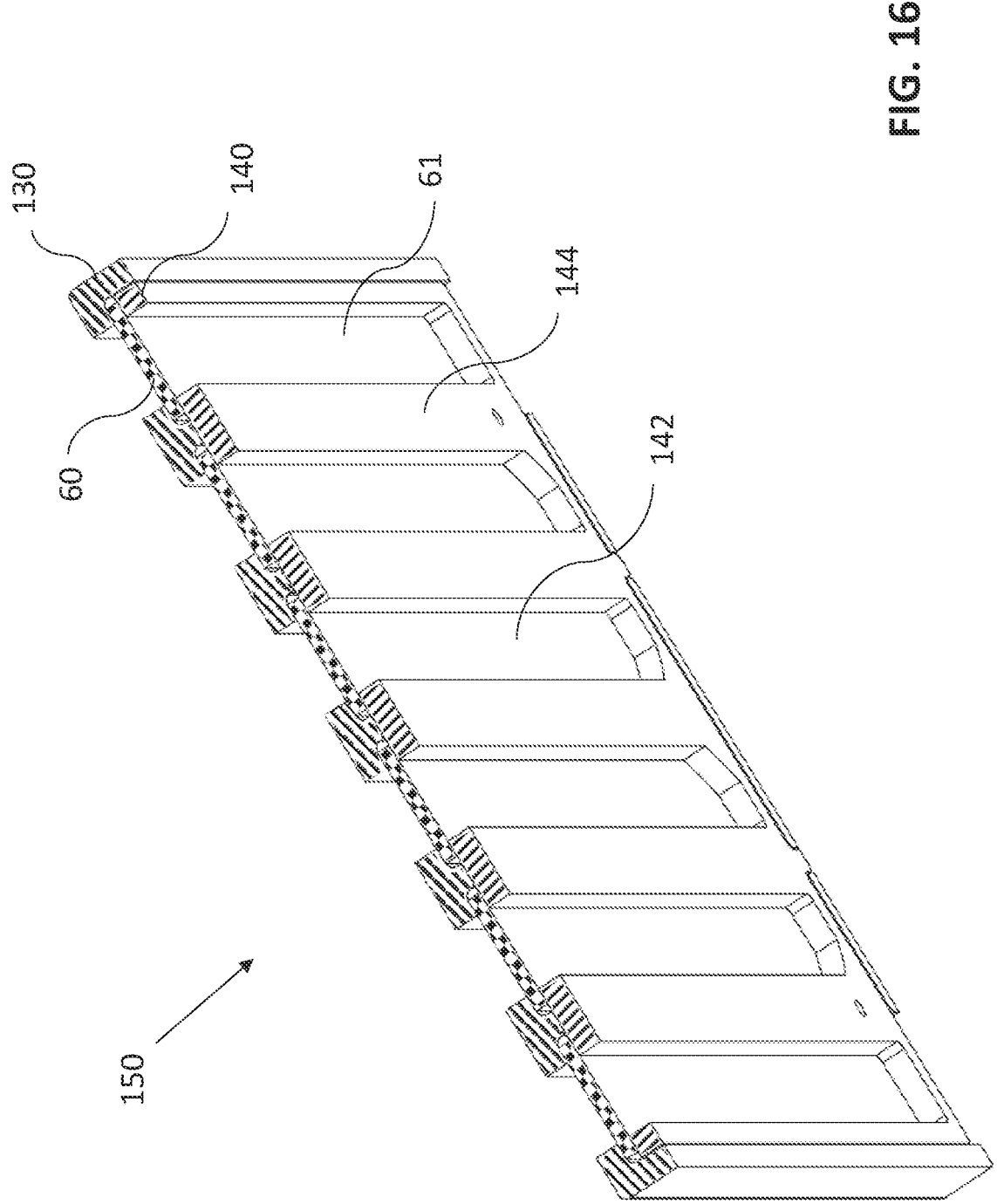

FIG. 14 shows the elongated body 60 placed inside the lower cover 13, while FIG. 15 shows the same with the top cover 140 assembled together with the lower cover 130. FIG. 16 shows a cross-section of the assembly comprising both the top cover 140 and the lower cover 130 with the elongated body 60 trapped in-between. Of note is the exposure of straight sections 61 of the metal foam elongated body 60 through the openings 142 between the parallel struts 144. This allows for unrestricted access of airflow to proceed through the foam body 60 while precluding any streams of air from passing around it.

Figure 17:
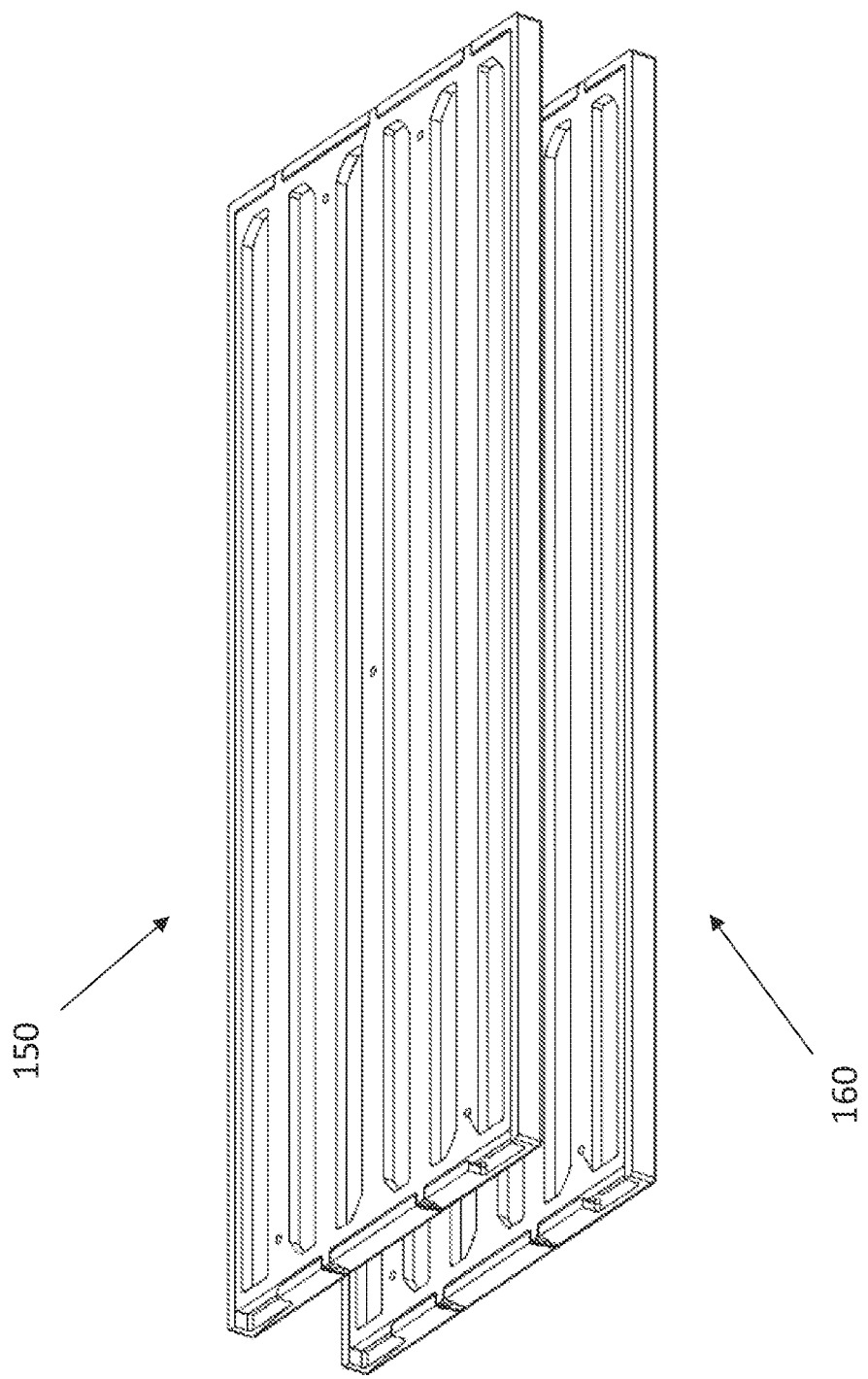
FIG. 17 is a perspective view of the first open-cell foam layer and the second open-cell foam layer within their respective enclosures.

FIG. 17 shows the design of the air filter having the first foam layer assembly 150 and the second foam layer assembly 160 placed in series and across the direction of the airflow. The second elongated body may be equipped with respective third and fourth electrodes attached to the first and second ends of thereof.

Figure 18:
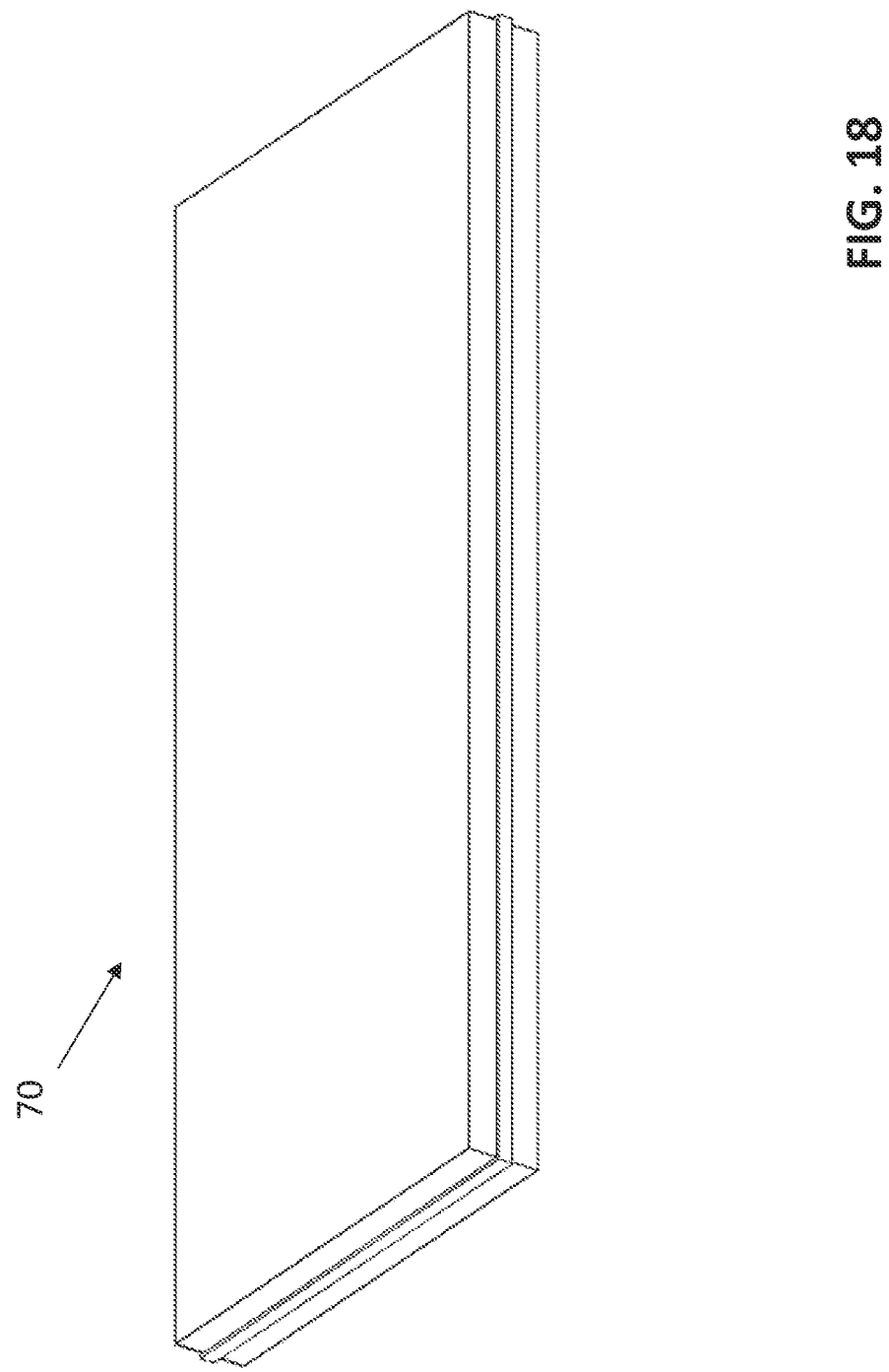
FIG. 18 is a perspective view of the HEPA filter.
Figure 19:
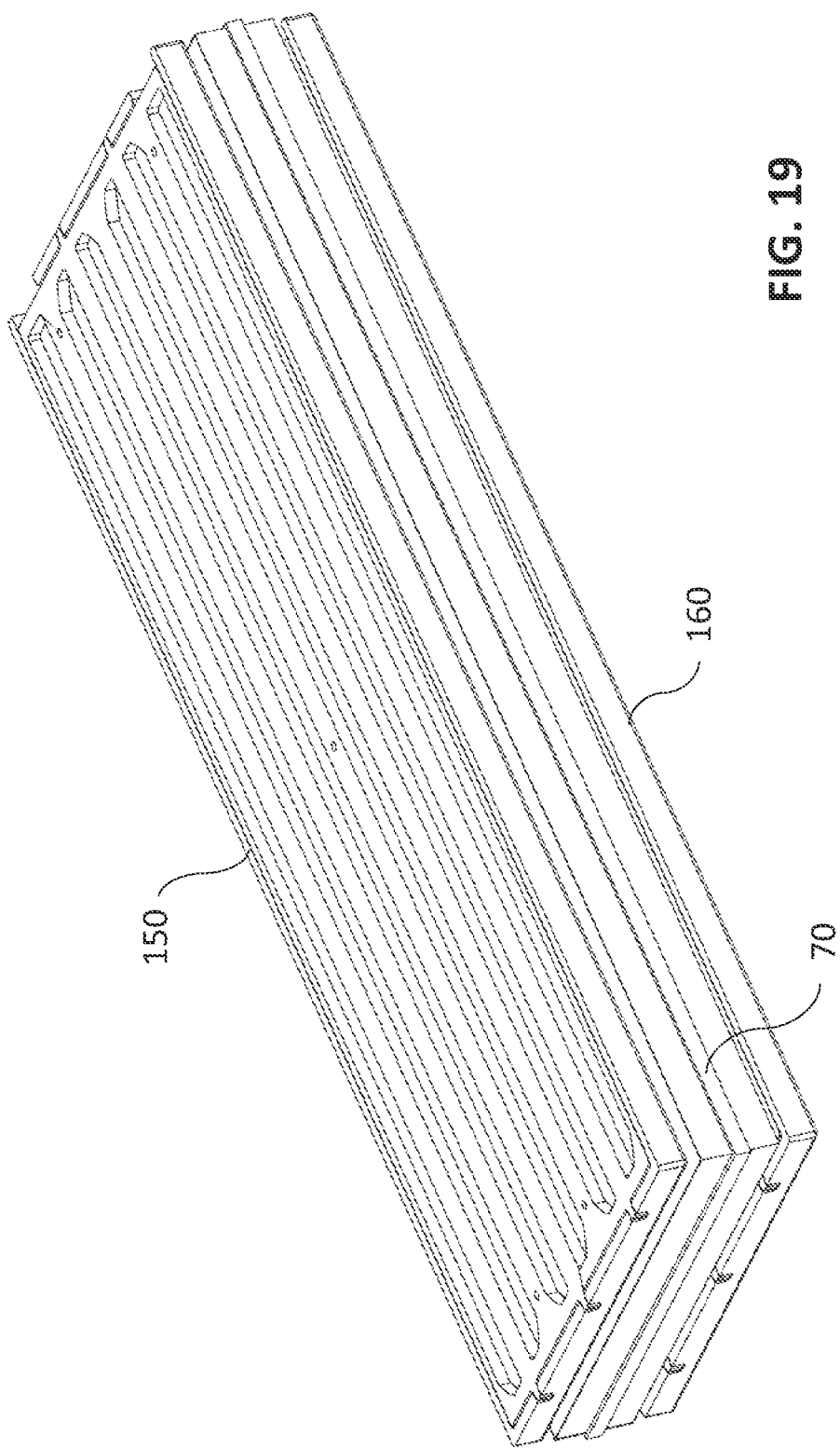
FIG. 19 is a perspective view of the same as in FIG. 17 with the addition of the HEPA filter in-between the first and the second open-cell foam layers.

FIG. 18 shows a general view of the additional HEPA filter 70, which may be placed between the first foam layer 150 and the second foam layer 160 as seen in FIG. 19. The entire 3-stage assembly or a portion thereof may be configured for easy removal and replacement using the back door 103 on the housing of the filter.

In operation, the air filter 10 may be plugged into a wall electrical outlet or attached to another source of power, such as an electrical connector in a car, a suitable battery, or alike. Air pump 4 may be operated by controller 5 to deliver the desired airflow through all stages of filtration and purification. The heating of the first stage 6 may be controlled and monitored independently of the second stage 8. In embodiments, the first stage 6 may be heated to reach a temperature set to be below, equal to, or exceeding the temperature of the second stage 8. In one example, the temperature of the first stage may be set to be below 100° C., while the temperature of the second stage may be set to be above 100° C., or even above 200° C. In a further example, the temperature of the first stage may be set to be at least 90° C., while the temperature of the second stage may be set to be at least 250° C. Selecting these temperatures may allow effective disinfection of the ambient air without overheating the air and avoiding the problem of emanating hot air from the air filter which may disturb people nearby.

As briefly mentioned above, a number of operating modes may be provided by controller 5 of the invention. In one mode of maximum efficacy, the controller may operate the first stage and the second stage at maximum safe temperatures and cause the air pump 4 to operate at maximum speed at all times. In a second, energy-saving mode, the controller 5 may be configured to operate the air pump at reduced speed and the heating of either one or both foam layers to be done at reduced temperatures. Upon detecting the presence of a human being in the vicinity of the filter or simply entering the room where the filter is located (using one or more proximity sensors 110, 112, 114), the controller may cause an increase in the output of the filter as well as an increase in the temperature of the first stage 6 or the second stage 8.

In further embodiments, the controller may be equipped with a remote communication module, which may allow a wireless connection to a corresponding smartphone or another remote-control device, which may allow remote operation of the air filter 10 on demand by the user.

In further embodiments, the operation of the air filter 10 may follow a pre-programmed time sequence, for example, the filter may be ON at times when people are present in the room and OFF when the room is expected to be empty.

In further yet embodiments, remote communication capability may be configured to operate more than one air filter at a time. Grouping of air filters may be used to assure a safe breathing environment for a large room where a single filter may not provide sufficient airflow disinfecting capacity.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic (s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A pathogen-disinfecting air filter comprising a first layer of heated open-cell foam in a housing with an air pump configured to direct airflow across the first layer, wherein the first layer of heated open-cell foam is formed by a first electrically-resistive elongated body made from a metal open-cell foam and extending from a first end to a second end thereof in a serpentine-folded pattern, wherein the first end is equipped with a first electrode, the second end is equipped with a second electrode, wherein the air filter further comprises a controller configured to apply electrical energy to the first electrode and the second electrode, thereby causing the first elongated body to heat up to a predetermined first temperature, thereby airborne pathogens are disinfected by heat while passing through the open-cell foam of the first layer.

2. The pathogen-disinfecting air filter, as in claim 1, further comprising a second layer of heated open-cell foam placed in series with the first layer in the housing, the second layer is formed by a second electrically-resistive elongated body made from a metal open-cell foam and extending from a third end to a fourth end thereof in a serpentine-folded pattern, the third end is equipped with a third electrode, the fourth end is equipped with a fourth electrode, wherein the controller is further configured to apply electrical energy to the third electrode and the fourth electrode, thereby causing the second elongated body to heat up to a predetermined second temperature, thereby airborne pathogens are disinfected by heat while passing through the open-cell foam of the first layer and then when passing through the open-cell foam of the second layer.

3. The pathogen-disinfecting air filter, as in claim 2, further comprising a heat-resistant air filter positioned in series with the first layer of heated foam and the second layer of heated foam in the same housing and configured to provide additional filtration to the airflow passing across therethrough.

4. The pathogen-disinfecting air filter, as in claim 3, wherein the heat-resistant air filter is placed between the first layer of heated foam and the second layer of heated foam.

5. The pathogen-disinfecting air filter, as in claim 3, wherein the heat-resistant air filter is a High Efficiency Particulate Air (HEPA) fiberglass filter.

6. The pathogen-disinfecting air filter, as in claim 2, wherein the controller is further configured to maintain the first temperature below the second temperature.

7. The pathogen-disinfecting air filter, as in claim 1, wherein the first temperature is selected to be at least 90 degrees C.

8. The pathogen-disinfecting air filter, as in claim 2, wherein the second temperature is selected to be at least 250 degrees C.

9. The pathogen-disinfecting air filter, as in claim 2, wherein the metal foam of either the first elongated body or the second elongated body is formed without a straight path for airflow across thereof.

10. The pathogen-disinfecting air filter, as in claim 1, wherein the metal foam is made from a Nickel-Chromium or a Ni—Fe-AL alloy.

11. The pathogen-disinfecting air filter, as in claim 1, wherein the serpentine-folded pattern of either the first elongated body or the second elongated body is configured to have rounded corners, thereby avoiding uneven heating along the length thereof.

12. The pathogen-disinfecting air filter as in claim 2, wherein the controller is configured to apply no more than 2,000 Watts of electrical power to both the first layer of heated foam and the second layer of heated foam, while still achieving at least 98% disinfection rate of airborne pathogens in the air after one pass through the air filter.

13. The pathogen-disinfecting air filter, as in claim 1, wherein the first layer of heated open-cell foam is enclosed between a top cover and a lower cover to thermally insulate and electrically isolate thereof, the top layer and the bottom layer having elongated openings aligned with straight sections of the first elongated body and configured to allow airflow therethrough but not around the first elongated body.

14. The pathogen-disinfecting air filter, as in claim 1, further comprising at least one proximity sensor operatively connected to the controller, wherein the controller is configured to activate or increase the airflow through the air filter upon detection of people present nearby using the at least one proximity sensor.

* * * * *